US 11,500,391 B2

(12) United States Patent
Sohn et al.

(10) Patent No.: US 11,500,391 B2
(45) Date of Patent: Nov. 15, 2022

(54) METHOD FOR POSITIONING ON BASIS OF VISION INFORMATION AND ROBOT IMPLEMENTING SAME

(71) Applicant: LG ELECTRONICS INC., Seoul (KR)

(72) Inventors: Byungkon Sohn, Seoul (KR); Jungmin Shim, Seoul (KR); Kyuchun Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 293 days.

(21) Appl. No.: 16/622,213

(22) PCT Filed: May 14, 2018

(86) PCT No.: PCT/KR2018/005512
§ 371 (c)(1),
(2) Date: Dec. 12, 2019

(87) PCT Pub. No.: WO2018/230845
PCT Pub. Date: Dec. 20, 2018

(65) Prior Publication Data
US 2021/0149413 A1    May 20, 2021

(30) Foreign Application Priority Data

Jun. 13, 2017 (KR) .......................... 10-2017-0074431

(51) Int. Cl.
G05D 1/02          (2020.01)
(52) U.S. Cl.
CPC ......... G05D 1/0248 (2013.01); G05D 1/0274 (2013.01); *G05D 2201/0203* (2013.01); *G05D 2201/0207* (2013.01)

(58) Field of Classification Search
CPC .............. G05D 1/0248; G05D 1/0274; G05D 2201/0203; G05D 2201/0207;
(Continued)

(56) References Cited

U.S. PATENT DOCUMENTS

| 8,024,072 B2 | 9/2011 | Park et al. |
| 8,781,164 B2 | 7/2014 | Lee et al. |

(Continued)

FOREIGN PATENT DOCUMENTS

| KR | 10-0926783 B1 | 11/2009 |
| KR | 10-2012-0065067 A | 6/2012 |

(Continued)

*Primary Examiner* — Bao Long T Nguyen
(74) *Attorney, Agent, or Firm* — Birch, Stewart, Kolasch & Birch, LLP

(57) ABSTRACT

The present invention relates to a method for positioning on the basis of vision information and a robot implementing the method. The method for positioning on the basis of vision information, according to an embodiment of the present invention, comprises the steps of: generating, by a control unit of a robot, first vision information by using image information of an object sensed by controlling a vision sensing unit of a sensor module of the robot; generating, by the control unit of the robot, a vision-based candidate position by matching the first vision information with second vision information stored in a vision information storage unit of a map storage unit; and generating, by the control unit, the vision-based candidate position as the position information of the robot when there is one vision-based candidate position.

16 Claims, 11 Drawing Sheets

(58) Field of Classification Search
CPC ......... G05D 2201/0211; G05D 1/0246; G05D 1/0231; G05D 1/0242; G06K 9/6289; G06K 9/00664; G06K 9/00791; G06K 9/6215; B25J 9/16; B25J 19/02; G01C 21/206; G01C 21/28; G01C 21/30; G01C 21/3848

See application file for complete search history.

(56) References Cited

U.S. PATENT DOCUMENTS

| | | |
|---|---|---|
| 9,058,521 B2 | 6/2015 | Yoon et al. |
| 2005/0182518 A1* | 8/2005 | Karlsson ................ G06V 20/10 700/253 |
| 2009/0210092 A1* | 8/2009 | Park ...................... G05D 1/0251 700/259 |
| 2016/0227193 A1 | 8/2016 | Osterwood et al. |

FOREIGN PATENT DOCUMENTS

| | | |
|---|---|---|
| KR | 10-2015-0130511 A | 11/2015 |
| KR | 10-2016-0090278 A | 7/2016 |
| KR | 10-1739996 B1 | 5/2017 |

* cited by examiner

FIG. 6

| Serial | Group | Pos | Character | Shape | VisionData |
|---|---|---|---|---|---|
| 1 | 1 | (5, 11) | E | Rectangle | E |
| 2 | 1 | (9, 3) | 3 | Rectangle | 3 |
| 3 | 1 | (16, 5) | M-D C-A | Rectangle | M-D C-A |
| 4 | 2 | (7, 3) | | | |
| 5 | 2 | (7, 8) | | | |
| 6 | 2 | (10, 16) | | | |

250a

FIG. 8
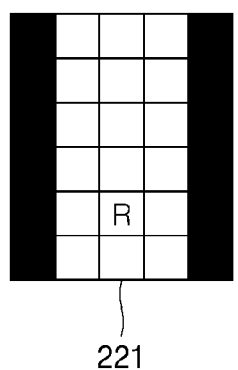
221
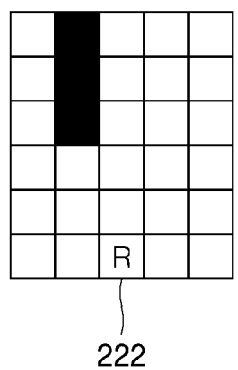
222

FIG. 10
250

| Serial | Group | Pos | Direction | Character | Shape | VisionData |
|---|---|---|---|---|---|---|
| 1 | 1 | (5, 11) | N | E | Rectangle | E |
| 2 | 1 | (9, 3) | S | 3 | Rectangle | 3 |
| 3 | 1 | (16, 5) | NE | M-D<br>C-A | Rectangle | M-D<br>C-A |

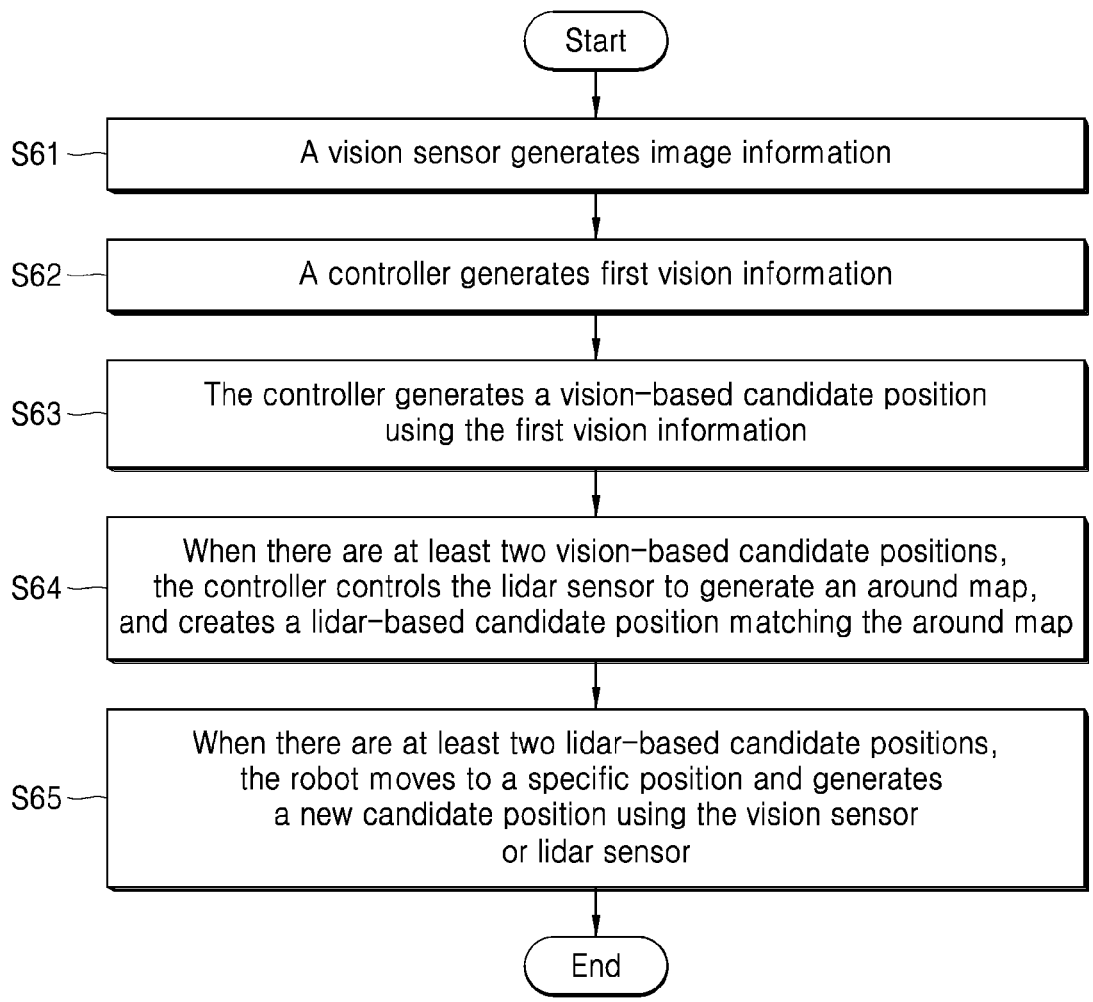

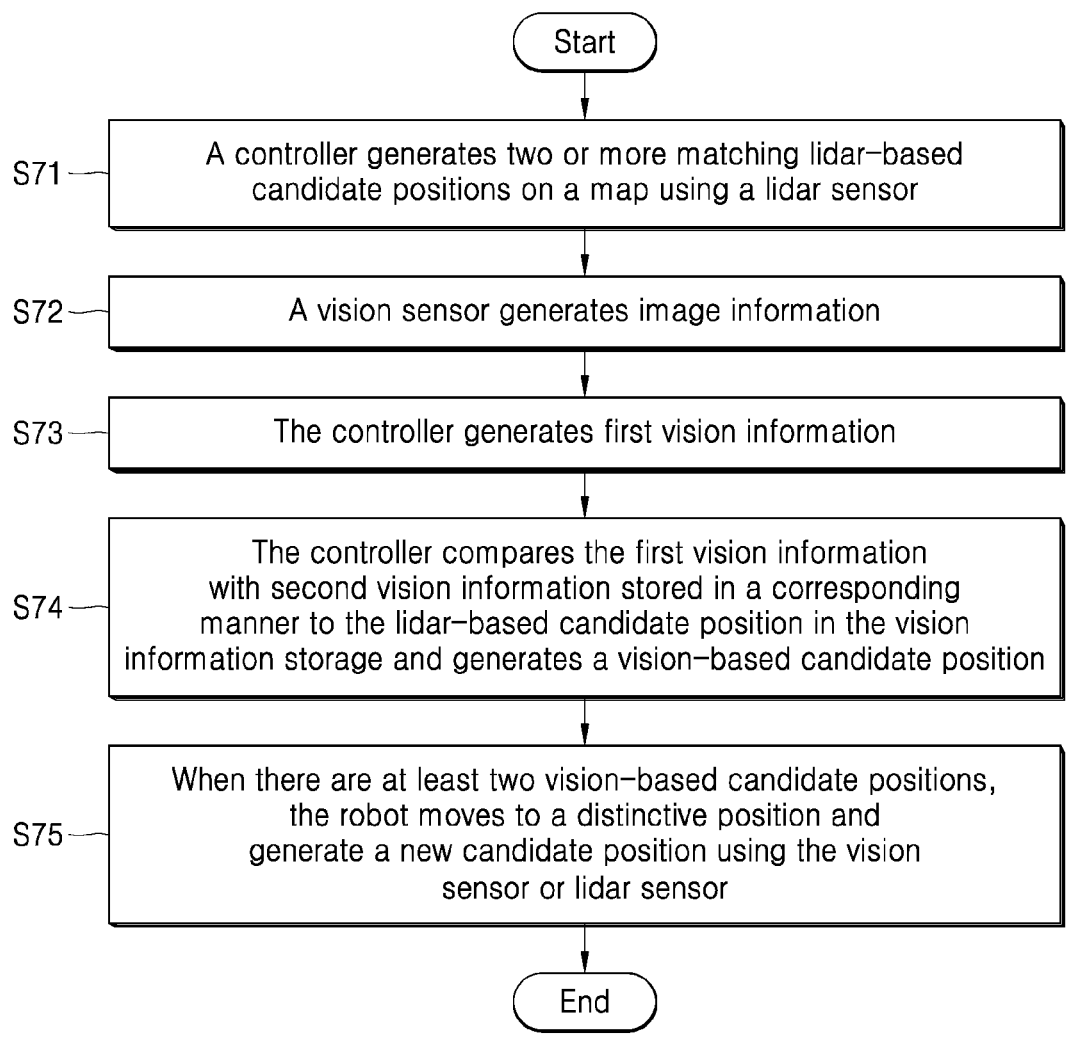

METHOD FOR POSITIONING ON BASIS OF VISION INFORMATION AND ROBOT IMPLEMENTING SAME

CROSS-REFERENCE TO RELATED APPLICATIONS

This application is the National Phase of PCT International Application No. PCT/KR2018/005512 filed on May 14, 2018, and claims priority benefit under 35 U.S.C. § 119(a) to Patent Application No. 10-2017-0074431, filed in Republic of Korea on Jun. 13, 2017, all of which are hereby expressly incorporated by reference into the present application.

FIELD

The present disclosure relates to a method for setting a position based on vision information, and a robot for implementing the same.

DESCRIPTION OF RELATED ART

In order to operate a robot in a space where movements of people and objects are actively occurring, such as an airport, a school, a public office, a hotel, a company office, or a factory, cultural facilities such as a gymnasium and a performance hall, etc. the robot must have a map of an entirety of the space. In this connection, the map is created based on a point in time. The robot needs to identify a current position of the robot based on the map. In order to set a position of the robot on the map, the map may be compared with surrounding information identified by the robot.

In one example, in the above-described large spaces such as airports, harbors, and train stations, repeating structures may be arranged. This may reduce accuracy at which the robot sets its position on the map. This is because specific corridors or specific rectangular spaces are repeatedly formed in a large space, but there is a limit in distinguishing therebetween.

In particular, when the robot needs to distinguish between spaces of similar shapes within a map and operate based on the distinguishing result, it is necessary for the robot to obtain further information for identifying a position in addition to structure information in the map. However, use of information such as GPS information in an indoor space has limitations. Thus, a more precise way in which the robot sets the position thereof on the map is required.

DISCLOSURE

Technical Purposes

The present disclosure solves the above problem. One purpose of the present disclosure to provide a method in which a robot uses vision information to set an initial position thereof, and a robot that implements the method.

Further, another purpose of the present disclosure is to provide a method using vision information so that an initial position of a robot may be set more accurately and quickly using lidar sensing results partially generated in a large space, and a robot that implements the method.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

Technical Solutions

One embodiment of the present disclosure provides a method for setting a position of a robot based on vision information, the method comprising: controlling, by a controller of the robot, a vision sensor of a sensor module of the robot to generate first vision information using image information of a sensed object; matching, by the controller of the robot, the first vision information with second vision information stored in a vision information storage of a map storage to generate a vision-based candidate position based on the matching result; and when a single vision-based candidate position is present, generating, by the controller of the robot, position information of the robot as the single vision-based candidate position.

Another embodiment of the present disclosure provides a method for setting a position of a robot based on vision information, the method comprising: controlling, by a controller of the robot, a lidar sensor of a sensor module of the robot to generate an around map using lidar information of a sensed object; generating, by the controller, a lidar-based candidate position matching the around map in a map of a map storage; when at least two lidar-based candidate positions are present, controlling, by the controller, a vision sensor of the sensor module to generate first vision information using image information of a sensed object; and comparing, by the controller, the first vision information with second vision information stored in a corresponding manner to each lidar-based candidate position in a vision information storage of the map storage and generating a vision-based candidate position based on the comparison result.

Still another embodiment of the present disclosure provides a robot configured for setting a position of the robot based on vision information, the robot comprising: a driver configured to move the robot; a sensor module configured to sense image information of an external object; a map storage for storing therein position information of objects in a space where the robot travels; and a controller configured to set a current position of the robot in the map storage using first vision information generated from the image information of the object sensed by the sensor module.

Technical Effects

When applying the embodiments of the present disclosure, a robot may use vision information to set an initial position thereof, and may control a travel route thereof.

Further, when applying the embodiments of the present disclosure, the robot may use vision information so that an initial position of the robot may be set more accurately and quickly using lidar sensing results partially generated in a large space.

Effects of the present disclosure are not limited to the above defined effects. Those skilled in the present disclosure may readily derive various effects of the present disclosure from configurations as disclosed in the present disclosure.

BRIEF DESCRIPTION OF DRAWINGS

FIG. 6 is a diagram showing a configuration of vision information storage according to an embodiment of the present disclosure.

FIG. 8 illustrates a process of identifying position information of a lidar sensor based on vision information according to an embodiment of the present disclosure.

FIG. 10 illustrates an example in which position information of vision information storage indicates a position at which a robot senses an object according to an embodiment of the present disclosure.

FIG. 11 illustrates a process of setting an initial position of a robot using vision information of a vision sensor according to an embodiment of the present disclosure.

FIG. 12 illustrates a process of setting an initial position of a robot using vision information of a vision sensor according to another embodiment of the present disclosure.

DETAILED DESCRIPTIONS

Figure 1:
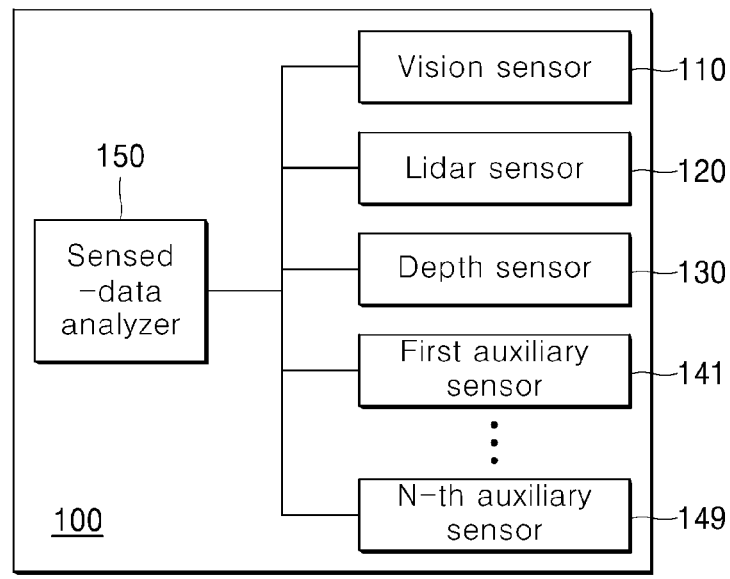
FIG. 1 is a diagram showing a configuration of a sensor module constituting a robot according to an embodiment of the present disclosure.

Hereinafter, exemplary embodiments of the present disclosure will be described in detail with reference to the accompanying drawings so that those skilled in the art may easily implement the present disclosure. The present disclosure may be embodied in many different forms and should not be construed as limited to the embodiments set forth herein.

In order to clarify the present disclosure, the present disclosure has omitted components not related to the description. Like reference numerals designate like or similar components throughout the specification. Further, the embodiments of the present disclosure will be described in detail with reference to exemplary drawings. In allocating reference numerals to components of each drawing respectively, the same component may have the same reference numeral even though the same component is displayed on different drawings. Further, well-known methods, procedures, and components have not been described in detail so as not to unnecessarily obscure aspects of the present disclosure.

It will be understood that, although the terms "first", "second", "third", A, B, (a), (b), and so on may be used herein to describe various elements, components, regions, layers and/or sections, these elements, components, regions, layers and/or sections should not be limited by these terms. These terms are used to distinguish one element, component, region, layer or section from another element, component, region, layer or section. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may be present.

Further, in implementation of the present disclosure, for convenience of explanation, a single component may be divided into sub-components. In this connection, components may be implemented in a single device or module. Alternatively, a single component may be divided into sub-components which are distributed in multiple devices or modules respectively.

Hereinafter, according to the present disclosure, a robot may include a device having a specific purpose (cleaning, security, monitoring, guidance), or providing a service based on characteristics of a space in which the robot moves. Thus, the robot according to the present disclosure collectively refers to an apparatus that has movement means for moving the same using predefined information and sensors and is configured to provide a predefined service.

In accordance with the present disclosure, the robot may move while using a map. The map refers to information about stationary walls, stairs, etc. that have been identified as not moving in a space. Further, the robot may store separate information on the map. For example, the robot may store vision information identifying a specific space on the map.

FIG. 1 is a diagram showing a configuration of a sensor module constituting a robot according to an embodiment of the present disclosure. A sensor module 100 may sense objects in an external space to generate a map. In addition, the sensor module 100 may calculate vision information of objects that may act as features among objects in an external space so that the vision information may be stored on a map together with position information.

More specifically, a vision sensor 110 for generating vision information of an object constitutes the sensor module 100. The vision sensor 110 captures objects around the robot to generate an image. Some image information among the image information generated by the vision sensor 110 is converted into vision information having a feature point necessary for setting a position. The image information has a color on each pixel basis. The vision information has meaningful information extracted from the image information.

A sensed-data analyzer 150 may add information such as a specific character, a specific shape, or a specific color to the image information calculated by the vision sensor 110, and then may provide resulting information to a controller controlling the robot. Interaction of the sensor module 100 with other elements constituting the robot will be described later. In another example, a controller 900 of FIG. 2 to be described later may perform the function of the sensed-data analyzer 150 as described above.

A lidar sensor 120 transmits a laser signal and provides a distance to and material of an object reflecting the laser signal. Then, the robot may identify the distance, position, and direction of the object as sensed by the lidar sensor 120 and may generate a map based on the identifying result. When applying a SLAM (Simultaneous Localization And Mapping) scheme according to an embodiment of the present disclosure, the lidar sensor 120 produces sensed-data that may be used to create a map of a surrounding space. When the generated sensed-data is stored on the map, the robot may recognize its position on the map.

In more detail, the lidar sensor 120 may provide the sensed-data analyzer 150 with a pattern of a laser signal reflected from an object, for example, a time difference between the transmitted signal and the reflected signal or a signal intensity of the reflected signal. The sensed-data analyzer 150 may provide the robot with distance and characteristic information of the sensed object.

A depth sensor 130 may calculate depth (distance information) of an object around the robot. In particular, in a process of converting the image information generated by the vision sensor 110 into the vision information, depth information of an object included in the image information may be included in the vision information.

In addition, a plurality of auxiliary sensors 141 and 149 may constitute the sensor module 100 to assist the aforementioned three types of sensors or to increase the accuracy of sensing. The above-described auxiliary sensors may include an ultrasonic sensor, an infrared sensor, a temperature sensor, or the like. These auxiliary sensors and the aforementioned vision sensor 110, lidar sensor 120, and depth sensor 130 provide the robot with information which the robot uses to generate a map based on SLAM and identify a current position of the robot on the map.

Figure 2:
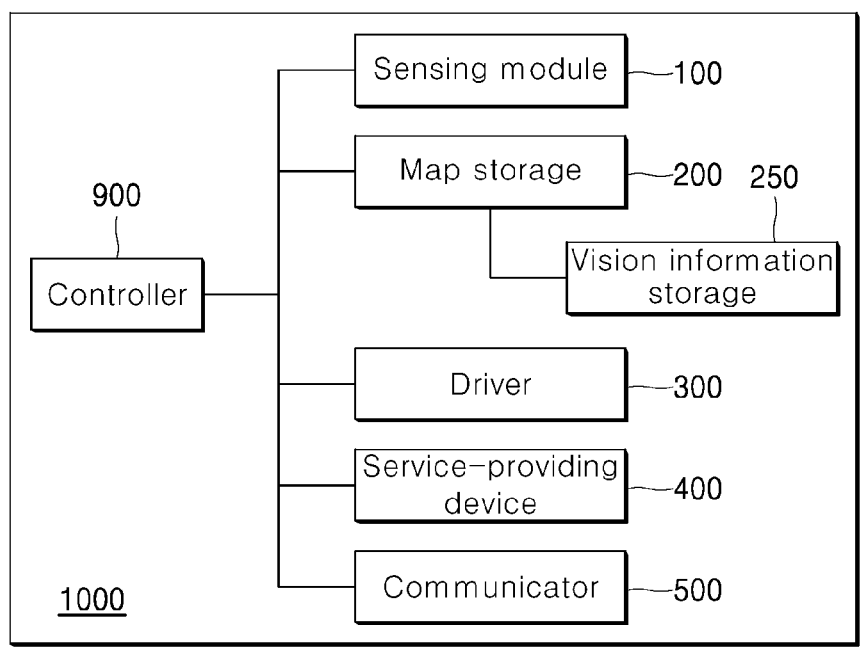
FIG. 2 shows components of a robot according to an embodiment of the present disclosure.

FIG. 2 shows components of a robot according to an embodiment of the present disclosure. A robot 1000 may include the sensor module 100 that senses objects placed outside the robot, and generates vision information of these objects, map storage 200 for storing a map, a driver 300 that moves the robot and control the movement mechanically or electronically, a service-providing device 400 that performs a predefined service of the robot, a communicator 500 that sends and receives the vision information about the external objects to and from other robots, and a controller 900 that controls these components.

The sensor module 100 is the same as described with reference to FIG. 1. The map storage 200 stores information about objects placed in a space where the robot moves. The map storage 200 stores position information of objects such as walls and doors, and may store therein height information of the objects based on the sensing result from the depth sensor 130. The vision sensor 110 of the sensor module senses image information of an external object. The controller 900 generates vision information from the image information in collaboration with the sensor module 100.

The map storage 200 may store position information of objects in a space where the robot travels. The storage 200 may store the information in a form of a map. In addition, the map storage 200 further includes vision information storage 250. The vision information storage 250 stores vision information about specific objects. That is, the position information of an object sensed by the sensor module 100 is stored in the map storage 200. The vision information identified at a specific position may be stored therein. In this connection, vision information may include vision information about an object placed on a ceiling or at a level higher than the robot as well as an object that may be placed in the movement path of the robot 1000.

Thus, the map storage 200 stores positions of objects which the robot needs to use to avoid the objects or calculate the travel route thereof. The vision information storage 250 stores vision information of an object that the vision sensor 110 may sense at a specific position at which the robot is present. The vision sensor 110 may calculate image information of an object placed on a ceiling or at a much higher position than a height of the robot such that the robot may not crash the object. One or more of the vision sensor 110, the sensor module 100, or the controller 900 may generate the vision information from the image information.

According to the present disclosure, one example where the sensed-data analyzer 150 of the sensor module 100 generates vision information from image information obtained by the vision sensor 110 is set forth. However, the present disclosure is not limited thereto. Further, functionality of the sensed-data analyzer 150 may be included in the controller 900. Hereinafter, according to the present disclosure, vision SLAM may refer to a series of processes in which the robot converts surrounding image information into vision information, and compares the vision information with vision information stored in the vision information storage 250 of the map storage and identifies a current position, that is, an initial position of the robot based on the comparison result.

The controller 900 may identify the current position of the robot on the map using the sensor module 100 as described above and may apply the SLAM process to update the map. In this process, the vision position generated by the vision sensor 110 may be used to accurately recognize the current position of the robot. That is, the current position of the robot may be set on the map storage using the vision information generated from the image information of the object sensed by the sensor module 100 as described above. In this process, the controller 900 may use the depth sensor 130 to accurately calculate position information of the object based on the vision information generated from the image information.

The driver 300 is configured for moving the robot 1000 and has a wheel. The driver 300 moves the robot 1000 under control of the controller 900. In this connection, the controller 900 may identify the current position of the robot 1000 in a region stored in the map storage 200 using the vision sensor 110 and the lidar sensor 120 and provide a movement signal based on the current position to the driver 300. Further, after the controller 900 analyzes the information about the external objects sensed by the sensor module 100 and then identifies whether there is a region which the robot may not enter in a travel direction, and then controls the movement of the driver 300 based on the identifying result.

The service-providing device 400 may be configured to provide a specialized service of the robot. For example, when the robot acts as a cleaning robot, the service-providing device 400 includes components necessary for cleaning. When the robot acts as a guide robot, the service-providing device 400 includes components necessary for guidance. When the robot acts as a security robot, the service-providing device 400 includes components necessary for security. The service-providing device 400 may include various components depending on a service provided by the robot. The present disclosure is not limited to those examples.

The communicator 500 receives information necessary for travel of the robot from an external robot or an external server, or transmits information acquired by the robot 1000 to an external robot or an external server.

Figure 3:
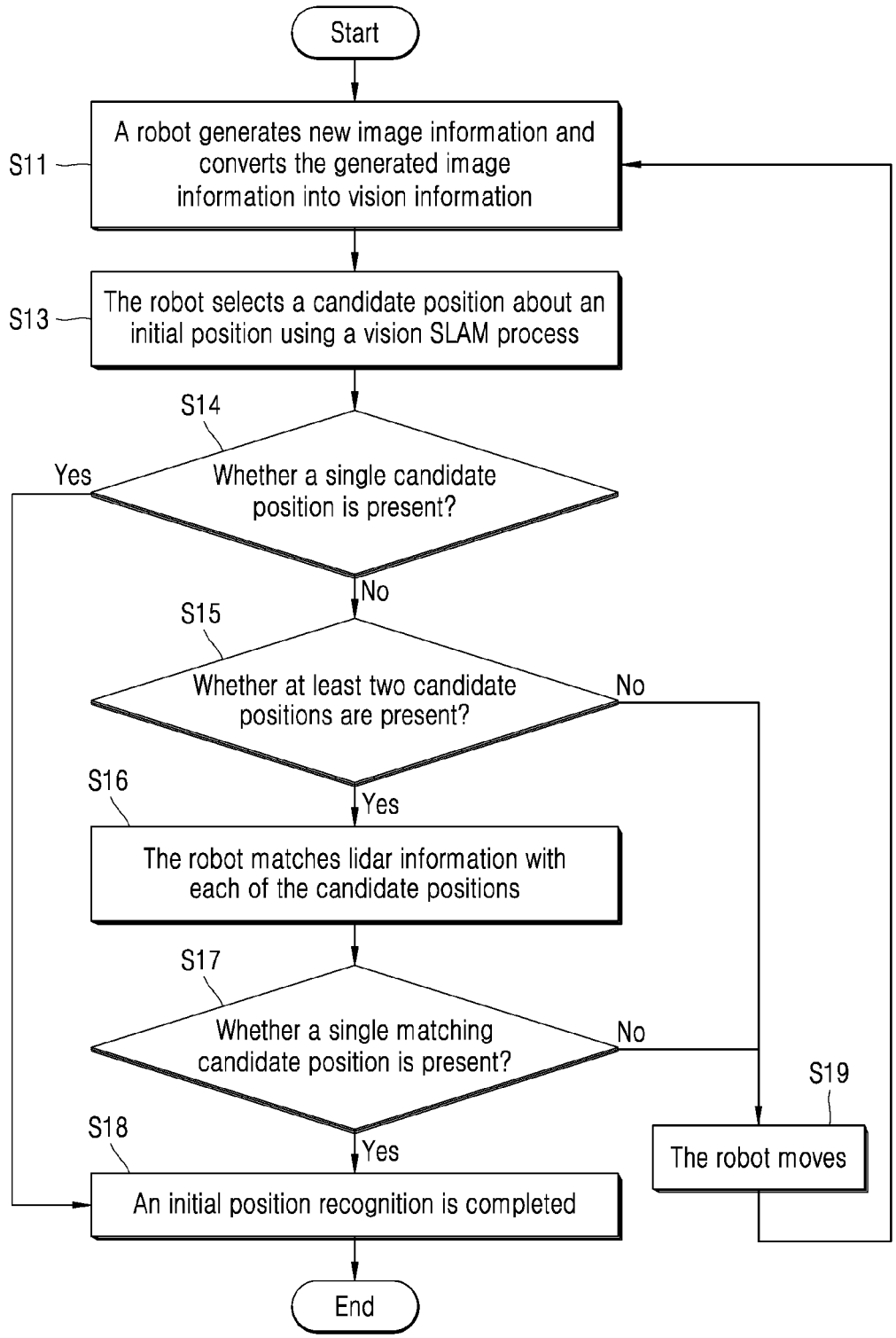
FIG. 3 illustrates a process of identifying a current position based on image information of a vision sensor according to an embodiment of the present disclosure.

FIG. 3 illustrates a process of identifying a current position based on image information of a vision sensor according to an embodiment of the present disclosure. When, before the robot travels, or during travelling, a position of the robot on the map does not match a current position of the robot, the robot performs a process of newly identifying a current position thereof. This is referred to as an initial position recognition process of the robot. FIG. 3 shows a process using the vision sensor 110 and lidar sensor 120 for the initial position recognition.

The robot generates new image information using the vision sensor 110. In addition, the robot converts the generated image information into vision information having features S11. In the S11 process, a plurality of vision information may be generated from one image information. This is because a large number of vision information as features such as letters or shapes may be included in one image information.

The robot then selects a candidate position about an initial position using the vision SLAM process S13. For example, in one embodiment, the robot may search the vision information stored in the vision information storage 250 for vision information similar or identical to the vision information generated in S11. Because position information corresponding to the searched vision information exists, the robot may extract the position information and select the extracted position as a candidate position to be set as an initial position. In this process, when there is only one candidate position, the initial position recognition is completed S18. The recognized initial position may be compared with the map in the map storage 200. Then, the robot may move or perform a service based on the comparison result.

In one example, when there are two or more candidate positions in S14 S15, the robot may generate lidar information using the lidar sensor 120 and match the lidar information with each of the candidate positions to increase accuracy of the candidate positions S16. For example, a position of each candidate position on the map, positions of objects as calculated on the map, and positions of neighboring objects as sensed by the lidar sensor 120 are compared with each other. The robot may match a position having a higher similarity therebetween with the candidate position. When one matching candidate position is present S17, the initial position recognition is completed S18. The recognized initial position may be compared with the map in the map storage 200. Then, the robot may move or perform a service based on the comparison result.

In one example, when there are not two or more candidate positions in S15, that is, when the candidate position is absent, the vision information generated in the processes S11 to S13 is not accurate. Thus, after the robot moves back and forth or left and right S19, the vision sensor 110 performs the S11 process of generating new image information and converting the image information to vision information.

Similarly, when there is a large number of matching candidate positions in S17, the vision information generated in the processes S11 to S13 is not accurate. Thus, after the robot moves back, forth, left, and right, the vision sensor 110 generates new image information and converts the image information to vision information.

The process of FIG. 3 is summarized as follows. Using the vision SLAM, the robot extracts the candidate positions being likely to be the current position from the map S11 to S13. When there is only one candidate position, the robot identifies that the robot is positioned in a corresponding position and completes the position recognition. On the contrary, when there are multiple candidate positions, a region corresponding to each candidate position is compared with currently input lidar information (positions of objects sensed by the lidar sensor), and, then, a region having a shape most similar to the lidar information is recognized as a current position of the robot S15 to S18.

When there are two or more candidate positions as recognized using the vision sensor 110 and lidar sensor 120 in FIG. 3, the robot may move in a front, rear, left or right direction to generate additional image information, and then select the most accurate initial position based on the newly generated image information.

Figure 4:
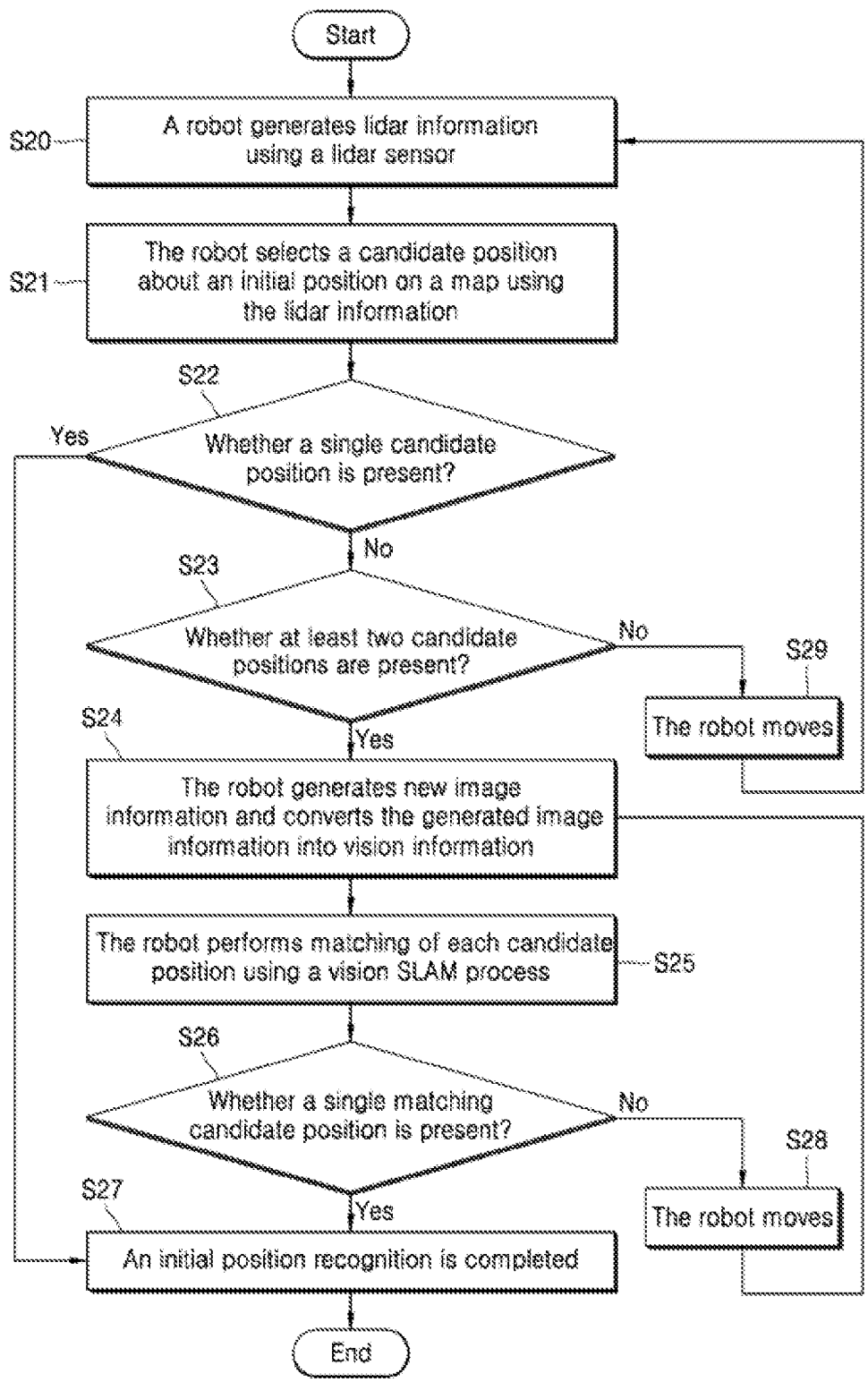
FIG. 4 illustrates a process of identifying a current position based on image information of a vision sensor according to another embodiment of the present disclosure.

FIG. 4 illustrates a process of identifying a current position based on image information of a vision sensor according to another embodiment of the present disclosure. The embodiment of FIG. 3 primarily provides criteria for selecting the candidate position when the vision sensor 110 recognizes the initial position. In contrast, an embodiment of FIG. 4 primarily provides criteria for selecting the candidate position when the lidar sensor 120 recognizes the initial position, and then recognizes an initial position among candidate positions based on the vision information of the vision sensor 110 when the number of the candidate positions is at least two.

When, before the robot travels, or during the travel process, a position on the map does not match a current position of the robot, the robot performs a process of newly identifying a current position thereof. This is referred to as an initial position recognition process of the robot. FIG. 4 shows a process using the vision sensor 110 and lidar sensor 120 for the initial position recognition.

The robot generates lidar information using the lidar sensor 120 S20. The robot selects a candidate position about an initial position on the map using the lidar information S21. The candidate position may be selected by comparing positions of objects stored on the map with recorded information of position of external objects sensed by the lidar sensor. In this process, when there is only one candidate position, the robot completes the initial position recognition S27. The recognized initial position may be compared with the map in the map storage 200. Then, the robot may move or perform a service based on the comparison result.

In one example, when, in S22, there are two or more candidate positions S23, the robot generates new image information using the vision sensor 110 to increase the accuracy of the candidate position. The robot converts the generated image information into vision information having features S24. In the S24 process, a plurality of vision information may be generated from one image information. This is because a large number of vision information as features such as letters or shapes may be included in one image information.

The robot then performs matching of each candidate position derived from the lidar sensor 120 using a vision SLAM process S25. For example, in one embodiment, the robot may search the stored vision information corresponding to the candidate positions among the vision information stored in the vision information storage 250 for vision information similar or identical to the vision information generated in S24. Because position information corresponding to the searched vision information exists, the robot may compare the stored vision information corresponding to position information of the candidate positions of the initial position with the vision information generated in S24, and may identify a matching candidate position among the candidate positions. When, from a result of the identification, there is one matching candidate position S26, the robot may complete the initial position recognition S27 and compare the recognized initial position with a map of the map storage 200. Then, the robot may move or perform a service based on the comparison result.

In one example, when there is not more than one candidate position in S23, that is, when a number of the candidate position is 0, the lidar information generated in S20 to S21 is not accurate. Thus, the robot moves back, forth, left, and right S29. The lidar sensor 120 performs the process S20 of generating new lidar information.

Further, when there is a plurality of matching candidate positions in S26, the vision information generated in S24 to S25 is not accurate. Thus, the robot moves back and forth or left and right S28. The vision sensor 110 performs the process 24 of generating new image information.

The process of FIG. 4 is summarized as follows. Using SLAM based on the sensing result from the lidar sensor 120, the robot extracts the candidate position to be the current position from the map S20 to S21. When there is only one candidate position, the robot identifies that the robot is positioned in the corresponding position and completes the position recognition. On the contrary, when there are multiple candidate positions, vision information corresponding to each candidate position is compared with currently input vison information (information extracted from the image information sensed by the vision sensor) and, then, a candidate position corresponding to a position of vision information most similar to the currently input vison information is recognized as a current position of the robot S24 to S27.

When applying the embodiments of FIG. 3 and FIG. 4, the initial position inaccuracy occurring when only one lidar sensor is used, and a problem that the robot has to move to several places occurring when only one vision SLAM is used may be removed. That is, the robot may recognize the accurate initial position quickly using the combination of the lidar sensor 120 and the vision sensor 110 using camera sensing.

Figure 5:
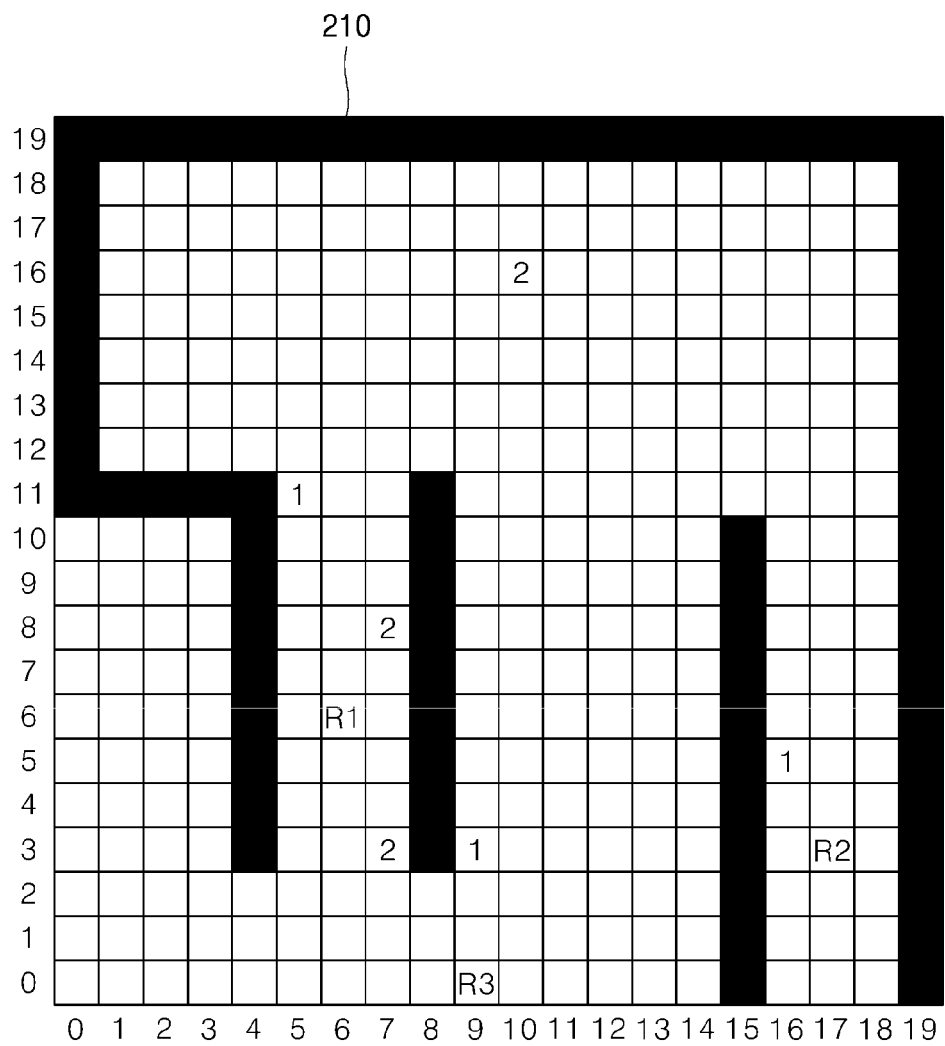
FIG. 5 is a diagram illustrating a configuration of a map stored in map storage according to an embodiment of the present disclosure.

FIG. 5 is a diagram illustrating a configuration of a map stored in map storage according to an embodiment of the present disclosure. A plurality of maps 210 may be stored in the map storage 200 and may be updated as the robot moves. The map stores therein positions of objects sensed using the lidar sensor 120 as the robot moves.

Referring to the map 210, the map has information about a space where the robot 1000 may move. The map divides an entire space into subdivided unit regions. The map shows a space where the robot cannot move because an object is placed in unit region. Further, a characters or number indicating vision information may be stored in a unit region of each map such that the robot may identify that vision information acquired during the travel of the robot is stored in the vision information storage.

In FIG. 5, positions of objects sensed by the lidar sensor 120 are shown in black. The numbers indicating the vision information may include 1, 2, . . . , 10. There are many ways to assign the numbers to the vision information. In one way, the vision information may be divided into predefined groups. The numbers may indicate the groups respectively. When the vision information is able to be classified, for example, when a group corresponds to vision information being circular, a group corresponds to vision information being a character, a group corresponds to vision information being a square, and a group corresponds to vision information having a specific color, group information about vision information that may be sensed at a corresponding position may be marked on the map. FIG. 5 stores one example where a number may be stored in unit region of the map and the number indicates that specific vision information may be identified at the corresponding position. On the contrary, a serial number indicating each vision information may be stored in unit region of the map.

In FIG. 5, the vision information groups are indicated by 1 and 2. 1 indicates a group of vision information for which a character is identified, while 2 indicates a group of vision information for which a character is not identified. R1, R2, and R3 indicate points as recognized by the robot as an initial position in an embodiment to be described later.

In the example shown in FIG. 5, the map 210 is divided into 20 cells defined by a horizontal x-axis and a vertical y-axis. Each cell in black indicates a region where the object is placed and thus the robot cannot travel. A cell as each unit region may store therein information of a certain size. That is, the map may be constructed in various ways. As shown in FIG. 5, the map may be divided into a predetermined number of unit regions (cells). Information on whether an object exists in each unit region and on whether vision information is stored in each unit region may be stored in the map on a cell basis.

FIG. 6 is a diagram showing a configuration of vision information storage according to an embodiment of the present disclosure. Contents stored in the vision information storage 250 may include a serial number Serial, a group number Group Number, a position Pos, a character, a shape, and vision data VisionData.

The serial number has a unique value for each data in the vision information storage. The group may be a criterion for classifying vision information as described above. The position information indicates position information on a map corresponding to vision information. As described above, in FIG. 5, each position (x, y) in the map is marked with 1 or 2. Position information corresponding to the marking is stored in Pos. The character may be extracted from character information constituting vision information using a character recognition scheme. The shape indicates a shape of an outline constituting vision information. The vision data VisionData may be obtained by extracting a feature from the image information acquired by the vision sensor 110 and storing the feature in a form of an image. The feature may include a color, a border, a character (letter), a shape, and so on.

Groups 2 250*a* which do not include a character among the vision data stored in the vision information storage 250 may correspond to a repeating pattern in an entire space. Thus, when the groups are not produced only in a specific space in a distinguishing manner, the groups may be deleted from the vision information storage 250. On the contrary, vision data corresponding to the groups 1 and including a character or a specific shape (rectangle) may be only a feature in the space. Thus, the vision data as the feature is kept in the vision information storage 250. Thus, the robot may perform the position recognition using the vision data, thereby to reduce the number of vision information to be compared.

When using the information in FIG. 5 and FIG. 6, the robot may acquire the image information using the vision sensor 110 at a current position and then compare the same with information stored in the vision information storage 250 and then search for vision information identical or similar to the vision information acquired by the robot, and then identify a position corresponding to the searched vision information.

In particular, in order to recognize an initial position of the robot in a large area, the initial position may be recognized while minimizing the movement of the robot using the lidar sensor 120 and the vision sensor 110 using the camera. When only one sensor is used, accuracy and speed problems may occur. For example, when only the lidar sensor 120 is used, it is difficult to identify the initial position when a large number of spaces of similar structure are arranged. When using only the vision sensor 110, the robot must continue to perform vision sensing in order to acquire various image information. Further, comparing the sensed vision information with multiple vision information may take a lot of time. Accordingly, according to an embodiment of the present disclosure, the sensing results from the lidar sensor 120 and the vision sensor 110 may be combined with each other to enable fast position recognition.

Figure 7:
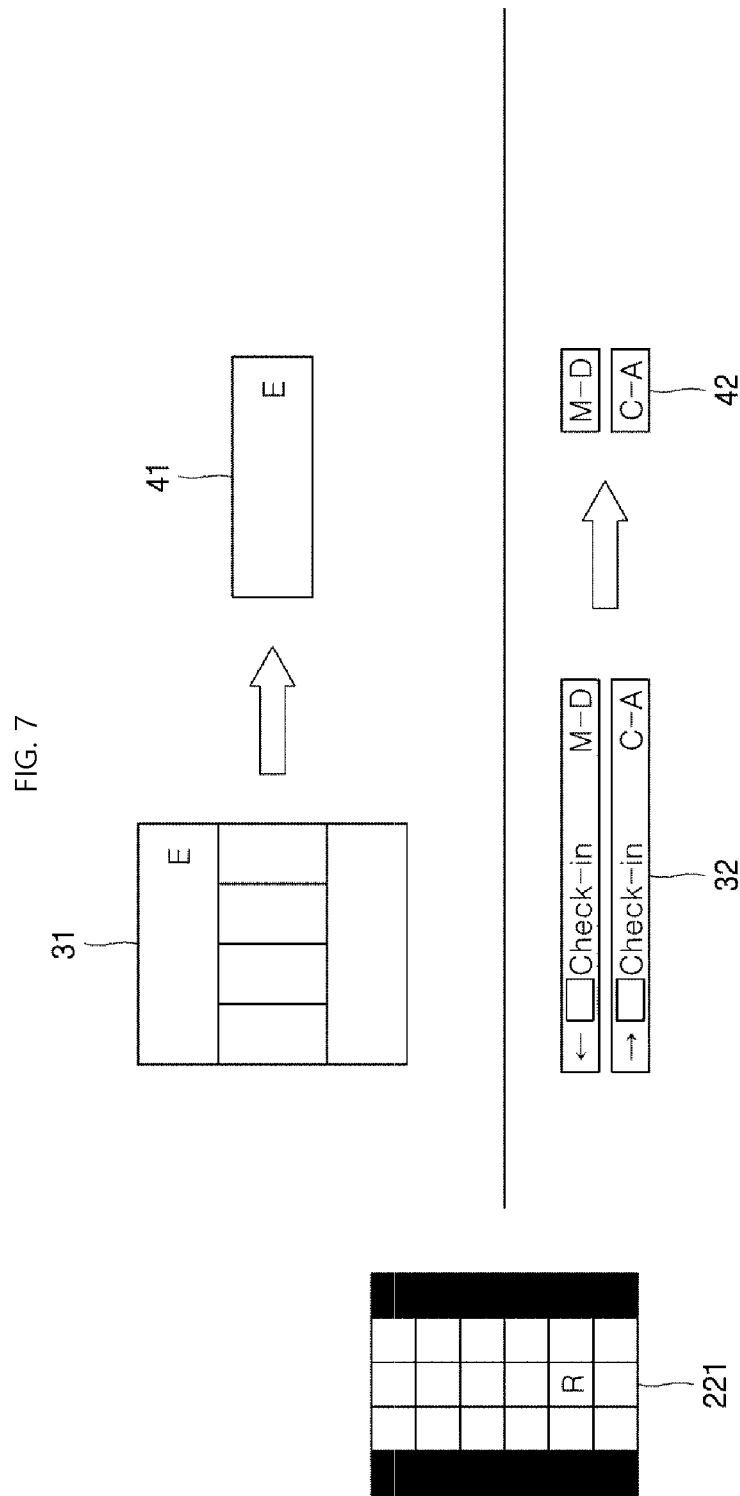
FIG. 7 is a diagram illustrating a process in which a robot recognizes a position according to an embodiment of the present disclosure.

FIG. 7 is a diagram illustrating a process in which a robot recognizes a position according to an embodiment of the present disclosure. In FIG. 7, one embodiment corresponds to one implementation of FIG. 4. 221 in FIG. 7 denotes an around map obtained by the robot 1000 performing lidar-sensing using the lidar sensor 120. When the controller 900 identifies a position of the around map 221 created when the robot is present at a position of R in the map 210 as shown in FIG. 5, the position of the around map 221 may correspond to a position of either R1 or R2 in FIG. 5. Further, to identify that the position of the around map 221 corresponds to the position of either R1 or R2, the robot may use the vision sensor 110 to acquire the vision information around the robot without the continuous movement of the robot.

When the image information acquired by the vision sensor 110 is an upper image 31, the controller 900 or the sensor module 100 may generate vision information 41 based on a letter "E" as a feature. Then, the controller may compare the vision information 41 with information stored in the vision information storage 250 of FIG. 6. Then, the controller 900 identifies that the vision information may be obtained from a position (5 and 11), based on the comparison result. As a result, the controller 900 of the robot may identify that a current position of the robot is the position of R1 (5, 11).

When the image information acquired by the vision sensor 110 is a lower image 32, the controller 900 or the sensor module 100 may generate the vision information 42 based on a letter "M-D C-A" as a feature. The vision information 42 is compared with the information stored in the vision information storage 250 of FIG. 6. The controller 900 identifies that the vision information may be obtained from a position (16, 5) based on the comparison result. As a result, the controller 900 of the robot may identify that a current position thereof is the position of R2 (16, 5).

When using the process shown in FIG. 7, the robot may recognize the initial position of the robot using the vision information in a state where only the lidar sensor cannot accurately identify the position of the robot on the map. Conversely, in contrast to FIG. 7, the robot may primarily generate the surrounding vision information and find the position of the robot in the vision information storage.

FIG. 8 illustrates a process of identifying position information of a lidar sensor based on vision information according to an embodiment of the present disclosure. When similar vision information is placed in the vision information storage generated by the robot, the robot may compare the vision information with the information generated by the lidar sensor. For example, this is a case when the vision information generated by the robot is similar to the vision data of the serial number 1 stored in the vision information storage of FIG. 6, and, similarly, when the vision data of the serial number 2 and the vision information generated by the robot are similar to each other, in other words, when (5, 11) or (9, 3) is a candidate position of the robot.

The lidar sensor 120 of the robot may perform lidar sensing at a current position of the robot to produce an around map. When the calculated around map is equal to the around map 221, the robot may compare the around map with the map (210 in FIG. 5) at each of the two candidate positions of the robot (5, 11) and (9, 3) as identified based on the vision information calculated by the vision sensor 110. As a result, because the map 221 corresponds to the position (5, 11), the robot position is identified as the position (5, 11).

On the contrary, when the around map calculated by the lidar sensor 120 of the robot is equal to the around map 222, the controller 900 may compare the around map with the map (210 in FIG. 5). As a result, because the map 222 corresponds to the position (9, 3), the robot position is identified as the position (9, 3).

When applying the embodiment of FIG. 8, the robot calculates the surrounding vision information, compares the same with the vision information stored in the vision information storage 250, calculates the candidate position based on the comparison result, and matches the around map generated by the lidar sensor 120 with the candidate position of the map (210 in FIG. 5) as described above, thereby calculating the position of the robot accurately while reducing the matching time.

According to one embodiment of the present disclosure, the robot may be configured as shown in FIG. 3 and FIG. 8 such that the robot may calculate the candidate position based on the sensing result of the vision sensor 110, and, then, the robot may compare the around map of the lidar sensor 120 with the map 210 of the entire space stored in the map storage 200 and may find the current position of the robot based on the comparison result.

Further, according to another embodiment of the present disclosure, the robot may be configured as shown in FIG. 4 and FIG. 7 such that the robot may calculate the candidate position based on the sensing result of the lidar sensor 120, and, then, may compare the vision information at the current position as calculated by the vision sensor 110 with the vision information stored in the vision information storage 250 and may find the current position of the robot based on the comparison result.

The robot may determine one between the lidar sensor 120 and vision sensor 110 to first use the sensing result thereof to search for the candidate position, based on sizes of the information generated by the two sensors, or a time required for the controller 900 to search for or match the information stored in the map storage 200.

In particular, when a space in which the robot needs to travel is large in an environment where the robot needs to know its initial position for an autonomous travel, it is necessary for the robot to know an area size of the map or the initial position of the robot for normal autonomous travel. However, it may take a long time to identify the initial position using only the lidar sensor. According to an embodiment of the present disclosure, combining the vision and lidar information may allow the initial position to be recognized accurately while reducing searching and matching time.

Figure 9:
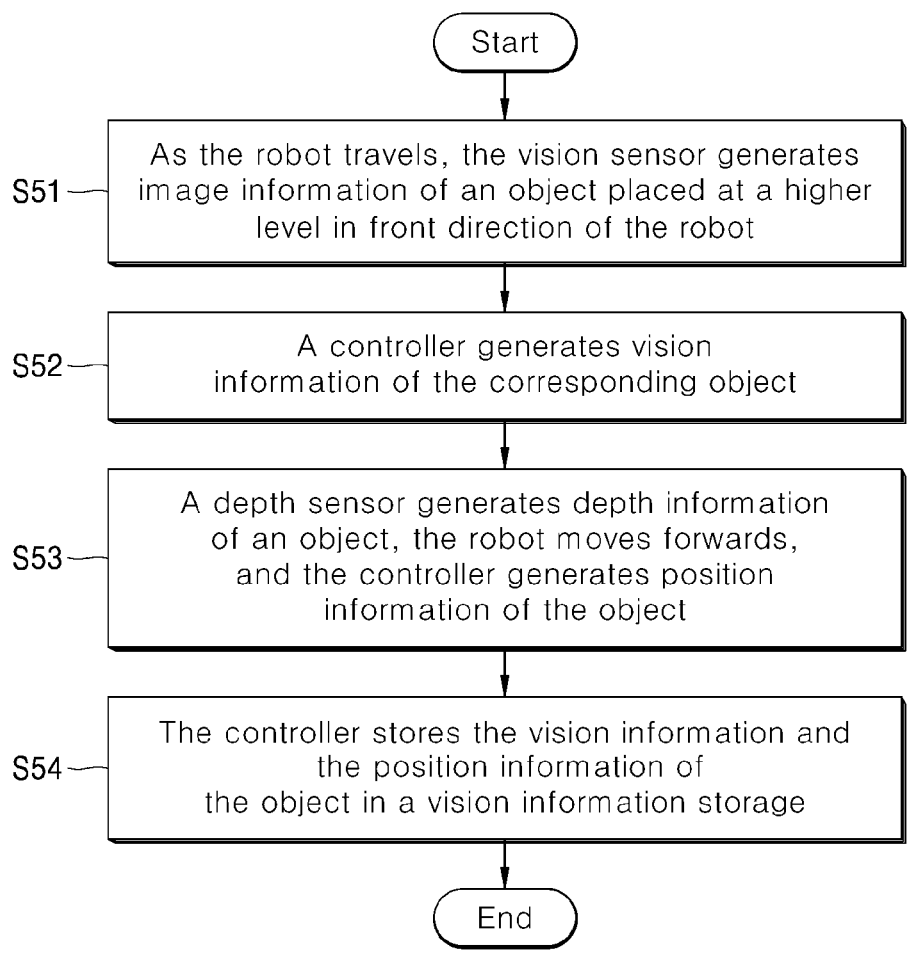
FIG. 9 illustrates a process of generating and storing vision information according to an embodiment of the present disclosure.

FIG. 9 illustrates a process of generating and storing vision information according to an embodiment of the present disclosure. The robot stores, in the vision information storage vision, information acquired in correspondence with a position on a map in a process of traveling, that is, movement thereof. This information is necessary for identifying a position of the robot in a process of setting an initial position of the robot.

As the robot travels, the vision sensor 110 generates image information of an object placed at a higher level and in front of the robot S51. The controller 900 generates vision information of the corresponding object using the sensor module 100 S52. The vision information has a feature such as a character, a color, and a shape. In one example, the feature may be extracted from the image information sensed by the vision sensor 110.

Next, the depth sensor 130 may generate depth information of the object for which the aforementioned vision information is generated and may calculate a depth of the object based on the depth information. The controller 900 may more accurately identify the position of the object during the forward travel. For example, the robot is continuously identifying the vision information of the object at a higher level in the forward direction. Then, when the robot is positioned directly below the object, the robot may not sense the object. In this connection, the robot may store the position of the object as the position of the robot. In another example, this process may reflect the depth information generated by the depth sensor 130. As a result, the position information of the object may be generated in S53.

The controller 900 stores the vision information and the position information of the object in the vision information storage 250 S54.

The position information of the vision information stored in the vision information storage 250 has two embodiments: an embodiment of storing an actual position on the map of the object corresponding to the vision information as position information, and an embodiment of storing a position of the robot at which an object corresponding to the vision information is sensed by the vision sensor as position information.

In the former case, the position of the vision information may be identified based on the above-described depth information, change in a shape of the object sensed by the robot, and change in a depth value during the travel process.

In the latter case, information about position and direction in which the robot senses the corresponding vision information may be stored in the vision information storage.

Briefly, the controller of the robot continuously generates new vision information using the vision sensor 110 during the travel process, and calculates the position information of the object and stores the vision information and position information of the object together in the vision information storage.

In particular, to store the position information of the object, the controller 900 may calculate the position information of the object using the depth information of the object using the depth sensor 130.

FIG. 10 illustrates an example in which position information of vision information storage indicates a position at which a robot senses an object according to an embodiment of the present disclosure.

The vision information storage 250 stores therein three vision information. Each position Pos and a direction indicate a position and a direction in which an object of vision information is sensed. A serial number 1 indicates the vision information sensed by the robot while the robot is located at (5, 11) and faces in a north direction N. Similarly, a serial number 3 indicates the vision information sensed by the robot while the robot is located at (16, 5) and faces in a northeast direction NE.

In FIG. 6, an objective position of the object is stored as position information. In FIG. 10, relative position where the object is sensed is stored as position information. Therefore, a position of the vision information may be newly converted in a process of recognizing the initial position of the robot based on how the robot stores vision information and position information.

FIG. 11 illustrates a process of identifying an initial position of a robot using vision information of a vision sensor according to an embodiment of the present disclosure.

The controller 900 controls the vision sensor 110 to generate image information S61. The controller 900 generates first vision information using the image information of the sensed object S62. The controller 900 matches the first vision information with second vision information stored in the vision information storage 250 and generates a vision-based candidate position based on the matching result S63. A process of converting the position information according to the characteristics of the position information at which the second vision information is stored in the vision information storage 250 as described above, may be added to the process S63.

For example, when position information of an object is stored, the vision-based candidate position is a position of the object. Thus, the controller may calculate a distance from the first vision information generated by the robot based on the vision-based candidate position and then identify a position of the robot based on the calculated distance.

On the contrary, when the position information of the robot that has sensed the object is stored together with the direction of the robot, the vision-based candidate position is the position of the robot, but a distance error may occur. This is because an image may be captured in a larger or smaller size depending on a distance between a specific object and the robot. Therefore, the controller 900 may compare the sizes of the first vision information and the second vision information generated by the robot with each other and may identify the exact position of the robot based on the comparison result.

When there is only one vision-based candidate position, the controller 900 may generate position information of the robot as the vision-based candidate position. On the contrary, when there are multiple vision-based candidate positions, the lidar sensor 120 may be used.

In one embodiment, the controller 900 controls the lidar sensor to generate an around map using the lidar information of the sensed object and, creates a lidar-based candidate position that matches the around map in a map of the map storage corresponding to one of the vision-based candidate positions S64. As previously seen in FIG. 5 and FIG. 8, when objects having similar or identical vision information are placed in a space, the robot will generate at least two vision-based candidate positions. In this case, the robot generates an around map (221 or 222 in FIG. 8), based on the positions of the surrounding objects S64.

The controller 900 attempts to match the generated around map with a position on the map 210 corresponding to the vision-based candidate position. The around map around the robot's surroundings is created by the lidar sensor 120. Matching the around map with the entire map 210 is time consuming. However, because the vision-based candidate position is created, matching the around map with specific positions on the map 210 indicated by these candidate positions may be performed, thereby to allow the position to be identified more quickly.

In this process, when the around map does not have a specific direction, the controller 900 may rotate the around map and compare the around map with a map of each vision-based candidate position.

When there are at least two lidar-based candidate positions from a result of the matching, the robot may move to a specific position and generate a new candidate position using the vision sensor 110 or lidar sensor 120 S65. That is, the controller may generate new vision information or a new around map to identify the initial position. In this connection, to create a new candidate position, the robot may move back, forth, left, or right within a certain range or at a predefined angle and generate more accurate vision information.

Referring to the S65 more specifically, the controller 900 may identify a distinctive candidate position using the vision information storage 250 or map 210 of the map storage 200 and may control the driver 300 to move the robot to the distinctive candidate position. In this connection, when a position at which vision information is stored in the vision information storage 250 is present within a predefined distance around a lidar-based candidate position (within a predefined distance in a front and rear direction or in a left and right direction or within a radius k meters), the position may be the distinctive candidate position. For example, when the robot moves forward to a position by one meter, there is a possibility that new vision information is present in addition to the currently identified vision information. In this case, the position may be the distinctive candidate position.

For example, in FIG. 5, the robot could not distinguish whether the robot has sensed vision information of (7, 8) or vision information of (7, 3). Thus, the robot has generated vision-based candidate positions of (7, 8), and (7, 3). One of the two vision-based candidate positions may not be determined using only the around map sensed by the lidar sensor 120. Now, this case will be described.

In this case, when the robot's position may be identified depending on whether the robot may move forward and sense vision information of (5, 11), the controller 900 may control the driver 300 of the robot to move forward. In this case, the position (5, 11) may be the distinctive candidate position. When the vision information of (5, 11) is not sensed after the robot moves forward, a previous position of the robot may be (7, 3).

Further, a position including a inflection point on the map may be the distinctive candidate position. In FIG. 5, a corner or open space may be placed on the map. When the robot moves within a certain range and creates a new around map, a position where the corner or open space may be sensed may be the distinctive candidate position.

However, it is necessary to adjust a distance between the robot and the distinctive candidate position. Thus, a distance within which the robot may move, such as 1 meter or 3 meters around the robot may be a predetermined distance based on, for example, a time required to generate a new candidate position after the robot moves, and a moving time duration thereof.

FIG. 12 illustrates a process of setting an initial position of a robot using vision information of a vision sensor according to another embodiment of the present disclosure.

The controller 900 generates two or more matching lidar-based candidate positions on the map using the lidar sensor 120 S71. Referring to the process S71 more specifically, the controller 900 of the robot controls the lidar sensor 120 to generate an around map using lidar information of a sensed object. The controller 900 generates a lidar-based candidate position that matches the around map in the map 210 of map storage 200.

Next, when there are two or more lidar-based candidate positions, the controller 900 controls the vision sensor 110 to generate image information S72. The controller 900 generates first vision information using the image information of the sensed object S73.

Then, the controller 900 compares the first vision information with second vision information stored in a corresponding manner to the lidar-based candidate position in the vision information storage 250 and generates a vision-based candidate position based on the comparison result S74. A process of converting the position information based on characteristics of the position information at which the second vision information is stored in the vision information storage 250 as described above may be added to the process S74.

For example, when position information of an object is stored, the vision-based candidate position is a position of the object. Thus, the controller may calculate a distance from the first vision information generated by the robot based on the vision-based candidate position and then identify a position of the robot based on the calculated distance.

On the contrary, when the position information of the robot that has sensed the object is stored together with the direction of the robot, the vision-based candidate position is the position of the robot, but a distance error may occur. This is because an image may be captured in a larger or smaller size depending on a distance between a specific object and the robot. Therefore, the controller 900 may compare the sizes of the first vision information and the second vision information generated by the robot with each other and may identify the exact position of the robot based on the comparison result.

When there is only one vision-based candidate position, the controller 900 may generate position information of the robot as the vision-based candidate position. On the contrary, when there are a large number of vision-based candidate positions, the robot may move to a distinctive position and generate a new candidate position using the vision sensor 110 or lidar sensor 120 S75. That is, the robot may generate new vision information or a new around map to identify the initial position of the robot. This is the same as previously seen in the process S65 of FIG. 11.

According to an embodiment of the present disclosure, even when an area of the map is large, the robot may recognize the initial position thereof by itself. That is, the vision-based candidate position as the candidate position of the initial position is selected based on the vision information acquired by the vision sensor 110. The controller may compare the around map generated by the lidar sensor 120 with the map of the vision-based candidate position to improve the initial position recognition accuracy.

To this end, as shown in FIG. 9, the robot accumulates the vision information sensed by the vision sensor 110 during the travel process and stores the accumulated vision information in the vision information storage 250. In this connection, the vision information is obtained by extracting a region having a feature from the image information. Thus, the robot may move to detect the feature easily. One embodiment of the feature may be a color, a shape of a boundary line, a letter, a character or a shape. A type (color, boundary, text, character or shape) of the feature may act as information constituting the feature.

Although all components constituting an embodiment of the present disclosure are described as being combined into a single component or operating in a combined manner thereto, the present disclosure is not necessarily limited to this embodiment. Within the scope of the present disclosure, all components may be selectively combined into at least two components or operate in a combined manner thereto. Further, each of all of the components may be implemented in a single independent hardware. In another example, some or all of the components may be selectively combined to be implemented as a computer program having a program module that performs some or all of functions combined in one or a plurality of hardware. Codes and code segments constituting the computer program may be easily derived by those skilled in the art of the present disclosure. Such a computer program may be stored in a computer readable storage medium and may be read and executed by a computer, thereby to implement an embodiment of the present disclosure. The storage medium of the computer program includes a storage medium including a magnetic recording medium, an optical recording medium and a semiconductor recording element. Further, the computer program for implementing an embodiment of the present disclosure includes a program module transmitted in real time through an external device.

In the above description, the present disclosure has been described with reference to embodiments of the present disclosure. However, various changes and modifications may be made at a level of knowledge of a skilled person to the art. Thus, it will be understood that such changes and modifications are included within the scope of the present disclosure unless they depart from the scope of the present disclosure.

| Reference numerals | |
|---|---|
| 100: Sensing module | 110: Vision sensor |
| 120: Lidar sensor | 130: Depth sensor |
| 141 to 149: Auxiliary sensor | 150: Sensed-data analyzer |
| 200: Map storage | 300: Driver |
| 400: Service-providing device | 500: Communicator |
| 900: Controller | 1000: Robot |

What is claimed is:

1. A method for setting a current position of a robot based on vision information, the method comprising:
   controlling, by a controller of the robot, a vision sensor of a sensor module of the robot to generate first vision information based on image information of a sensed object;
   searching a vision information storage of a map storage, by the controller, for stored vision information corresponding to the first vision information;
   matching, by the controller, the first vision information generated by the vision sensor with second vision information stored in the vision information storage of the map storage;
   generating one or more vision-based candidate positions based on a matching result of the matching;
   in response to the one or more vision-based candidate positions only including a single vision-based candidate position corresponding to the first vision information, setting, by the controller, the single vision-based candidate position as the current position of the robot; and
   in response to the one or more vision-based candidate positions including at least two vision-based candidate positions corresponding to the first vision information based on the searching the vision information of the map storage, generating, by the controller, an around map of surroundings of the robot based on lidar information of a sensed object by controlling a lidar sensor of the sensor module, and identifying, by the controller, at least one lidar-based candidate position stored in the map storage corresponding to the around map generated by the lidar sensor of the sensor module and at least one of the at least two vision-based candidate positions.

2. The method of claim 1, further comprising:
   in response to at least two lidar-based candidate positions stored in the map storage corresponding to the around map, identifying, by the controller, a distinctive location based on vision information stored in the vision information storage or a map stored in the map storage, and controlling, by the controller, a driver of the robot to move the robot to the distinctive location; and
   in response to the robot arriving at the distinctive location, generating, by the controller, a new candidate position using the vision sensor or the lidar sensor of the sensor module.

3. The method of claim 2, wherein the distinctive location includes at least one of:
   a position corresponding to a location of an object having vision information stored in the vision information storage that is within a predetermined distance around one of the at least two lidar-based candidate positions; or
   a position corresponding to an inflection point on the map.

4. The method of claim 1, further comprising:
   in response to the at least one lidar-based candidate position only including a single lidar-based candidate position corresponding to both of the around map and only one of the at least two vision-based candidate positions, setting, by the controller, the single lidar-based candidate position as the current position of the robot.

5. The method of claim 1, further comprising:
   controlling, by the controller, the vision sensor to generate third vision information while the robot travels; and
   calculating, by the controller, position information of an object included in the third vision information and then storing the position information together with the third vision information in the vision information storage.

6. The method of claim 5, further comprising:
   calculating, by the controller, position information of the object using depth information of the object sensed by a depth sensor including in the sensor module of the robot.

7. The method of claim 1, wherein the map storage stores position information of objects in a space where the robot travels and the vision information storage, and
   wherein the vision information storage stores vision information about specific objects among the objects in the space where the robot travels.

8. The method of claim 7, wherein the vision information includes a location position on a map for a corresponding object, and at least one of a character for the corresponding object, a shape of the corresponding object or vision data of the corresponding object.

9. A robot for self-setting a current position of the robot, the robot comprising:
   a driver configured to move the robot;
   a sensor module configured to sense image information of an external object;
   a map storage configured to store position information of objects in a space where the robot travels; and
   a controller configured to:
      generate first vision information based on the image information of the external object sensed by the sensor module, set the current position of the robot based on the position information stored in the map storage and the first vision information, match the first vision information generated based on the image information sensed by the sensor module with second vision information stored in the map storage, and generate one or more vision-based candidate positions based on a matching result of the match, in response to at least two vision-based candidate positions being present in the one or more vision-based candidate positions, control a lidar sensor of the sensor module to generate an around map of surroundings of the robot based on lidar information of a sensed object, and identify a lidar-based candidate position within a map of the map storage matching the around map and corresponding to one of the at least two vision-based candidate positions.

10. The robot of claim 9, wherein the map storage stores position information of objects in a space where the robot travels, and the map storage further includes a vision information storage, and wherein the vision information storage stores vision information about specific objects among the objects in the space where the robot travels.

11. The robot of claim 10, wherein the vision information includes a location position on a map for a corresponding object, and at least one of a character for the corresponding object, a shape of the corresponding object or vision data of the corresponding object.

12. The robot of claim 9, wherein the controller is further configured to calculate position information of the sensed object using depth information of the sensed object sensed by a depth sensor including in the sensor module of the robot.

13. A robot for self-setting a current position of the robot, the robot comprising:
a driver configured to move the robot;
a sensor module configured to sense image information of an external object;
a map storage configured to store position information of objects in a space where the robot travels; and
a controller configured to:
generate first vision information based on the image information of the external object sensed by the sensor module,
set the current position of the robot based on the position information stored in the map storage and the first vision information,
control a lidar sensor of the sensor module to generate an around map of surroundings of the robot based on lidar information of a sensed object,
identify one or more lidar-based candidate positions within a map of the map storage matching the around map,
in response to at least two lidar-based candidate positions being present among the one or more lidar-based candidate positions, compare the first vision information with second vision information stored in a corresponding manner to each of the at least two lidar-based candidate positions in the vision information storage, and
generate a vision-based candidate position based on a comparison result of the compare.

14. The robot of claim 13, wherein the controller is further configured to:
calculate position information of the sensed object using depth information of the sensed object sensed by a depth sensor including in the sensor module of the robot.

15. The robot of claim 13, wherein the map storage stores position information of objects in a space where the robot travels and the vision information storage, and
wherein the vision information storage stores vision information about specific objects among the objects in the space where the robot travels.

16. The robot of claim 15, wherein the vision information includes a location position on a map for a corresponding object, and at least one of a character for the corresponding object, a shape of the corresponding object or vision data of the corresponding object.

* * * * *